(12) United States Patent
Lutz et al.

(10) Patent No.: US 8,702,981 B2
(45) Date of Patent: Apr. 22, 2014

(54) WEDGE-SHAPED AND STACKABLE FILTER CARTRIDGES

(75) Inventors: Thomas Robert Lutz, Franklin, WI (US); Phillip C. Bartoszek, New Berlin, WI (US); Marco Pierobon, Padua (IT); Luca Bezzegato, Loreggia (IT); Fabio Bellia, Trebaseleghe(PD) (IT)

(73) Assignee: Central Garden & Pet Company, Walnut Creek, CA (US)

( * ) Notice: Subject to any disclaimer, the term of this patent is extended or adjusted under 35 U.S.C. 154(b) by 267 days.

(21) Appl. No.: 13/276,032

(22) Filed: Oct. 18, 2011

(65) Prior Publication Data

US 2013/0092614 A1 Apr. 18, 2013

(51) Int. Cl.
| | |
|---|---|
| *A01K 63/04* | (2006.01) |
| *B01D 29/50* | (2006.01) |
| *B01D 29/52* | (2006.01) |
| *B01D 35/00* | (2006.01) |
| *B01D 29/11* | (2006.01) |

(52) U.S. Cl.
USPC ............ 210/167.21; 210/167.22; 210/167.23; 210/167.24; 210/167.25; 210/167.27; 210/236; 210/416.2; 210/323.1; 210/470; 210/483; 210/484

(58) Field of Classification Search
None
See application file for complete search history.

(56) References Cited

U.S. PATENT DOCUMENTS

| | | | |
|---|---|---|---|
| 4,267,042 A | 5/1981 | Hofmann | |
| 4,272,372 A | 6/1981 | Fonseca | |
| 4,385,989 A | 5/1983 | Margolis | |
| 4,601,821 A | 7/1986 | Sherman et al. | |
| 4,713,173 A | 12/1987 | Goldman et al. | |
| 4,714,547 A | 12/1987 | Willinger | |
| 4,761,227 A | 8/1988 | Willinger et al. | |
| 4,894,151 A | 1/1990 | Woltmann | |
| 5,002,660 A | 3/1991 | Sherman et al. | |
| 5,092,991 A * | 3/1992 | Ogawa | 210/167.23 |
| 5,203,990 A | 4/1993 | Gargiulo | |
| 5,290,436 A | 3/1994 | Danner | |
| 5,397,463 A | 3/1995 | Woltmann | |
| 5,401,401 A | 3/1995 | Hickok et al. | |
| 5,693,220 A | 12/1997 | Sceusa | |
| 5,728,293 A | 3/1998 | Guoli et al. | |
| 6,585,888 B2 | 7/2003 | Axelrod | |
| 6,755,981 B2 | 6/2004 | Terato | |
| 6,866,773 B2 * | 3/2005 | Margovsky et al. | 210/167.22 |
| 7,060,181 B2 | 6/2006 | Fox et al. | |
| 7,241,379 B2 | 7/2007 | Agresta | |
| 7,252,762 B2 | 8/2007 | Carley | |
| 7,316,775 B2 | 1/2008 | Carley et al. | |
| 7,425,274 B1 | 9/2008 | Helfet | |
| 7,429,321 B2 | 9/2008 | Willinger | |
| 7,488,417 B2 | 2/2009 | Chauquet et al. | |
| 7,553,411 B2 | 6/2009 | Huehn et al. | |
| 7,569,139 B2 | 8/2009 | Mihlbauer et al. | |
| 7,601,259 B2 | 10/2009 | Mihlbauer et al. | |
| 7,618,534 B2 | 11/2009 | Mihlbauer et al. | |
| 7,628,913 B2 | 12/2009 | Willinger | |
| 7,638,044 B2 | 12/2009 | Huehn et al. | |
| 7,651,609 B2 | 1/2010 | Huehn | |
| 7,658,842 B2 | 2/2010 | Huehn et al. | |
| 7,670,484 B2 | 3/2010 | Newman et al. | |
| 7,771,592 B2 | 8/2010 | Mihlbauer et al. | |
| 7,927,483 B2 | 4/2011 | Huehn | |
| 2009/0045113 A1 * | 2/2009 | Newman et al. | 210/167.25 |

* cited by examiner

*Primary Examiner* — Benjamin Kurtz
(74) *Attorney, Agent, or Firm* — Andrus Intellectual Property Law, LLP

(57) ABSTRACT

Disclosed herein are wedge-shaped filter cartridges having a maximized upstream surface area. The filter cartridges are modular and may be stacked in a filter cartridge system.

17 Claims, 17 Drawing Sheets

WEDGE-SHAPED AND STACKABLE FILTER CARTRIDGES

BACKGROUND

The field of the invention relates to filtration systems and components for filtering water. In particular, the field of the invention relates to filter cartridges and filtering systems that utilize filter cartridges for filtering water in a terrarium.

Aquarium filter systems utilizing filter cartridges are known in the art. (See, e.g., U.S. Pat. Nos. 7,927,483; 7,771,592; 7,670,484; 7,658,842; 7,651,609; 7,638,044; 7,628,913; 7,618,534; 7,601,259; 7,569,139; 7,553,411; 7,488,417; 7,429,321; 7,425,274; 7,316,775; 7,252,762; 7,241,379; 7,060,181; 6,755,981; 6,585,888; 5,728,293; 5,693,220; 5,401,401; 5,397,463; 5,290,436; 5,203,990; 5,002,660; 4,894,151; 4,761,227; 4,714,547; 4,713,173; 4,601,821; 4,385,989; 4,272,372; and 4,267,042, the contents of which are incorporated herein by reference in their entireties). However, traditional aquarium filters typically are designed for tanks that are filled completely with water. As such traditional aquarium filters are not suitable for filtering water in a terrarium for pet reptiles and amphibians, which is not completely filled with water.

Many commonly kept pet reptiles and amphibians require naturalistic terrariums to satisfy their habitat and care requirements in captivity. For species that are aquatic or semi-aquatic this means an area of water is provided in the terrarium to facilitate natural behaviors. Water filtration units are available that are designed to be submerged in these shallow areas of water inside the terrarium to provide water movement, filtration, and/or aeration. These filtration units are typically small in order to function properly in shallow water, be as unobtrusive as possible in the water area, and also easily hidden by décor in the terrarium to maintain a natural appearance. However, improved filter systems and filter cartridges exhibiting smaller size, ease of use, and modularity are desirable.

SUMMARY

Disclosed herein are filter cartridges having a maximized upstream surface area. The filter cartridges are modular and may be stacked in a filter cartridge system.

In some embodiments, the disclosed cartridges are wedge-shaped and may be utilized in water filtrations systems for terrariums. The cartridge include a substantially vertical downstream backwall that permits egress of filtered water and include two substantially vertical upstream sidewalls permitting ingress of water for filtration. The upstream sidewalls typically are positioned at an angle relative to the downstream backwall and form a wedge shape. The walls may be porous. For example, the walls may be grated.

The disclosed cartridges may be stackable. In some embodiments, the disclosed cartridges include male and female connecting components on a top and bottom surface. For example, the disclosed cartridges may include at least one tongue on a top surface and at least one groove on a bottom surface, such that the tongue and groove are substantially aligned for attaching two or more cartridges via sliding the tongue of a first cartridge into the groove of a second cartridge. In other embodiments, the disclosed cartridges may include at least one tongue on a bottom surface and at least one groove on a top surface, wherein the tongue and groove are substantially aligned for attaching two or more cartridges via sliding the tongue of a first cartridge into the groove of a second cartridge.

The disclosed cartridges include a substantially vertical downstream backwall that permits egress of filtered water. The downstream backwall may be removably attached to the cartridge. For example, the downstream backwall may be removed in order to insert filtration material into the cartridge. In some embodiments, the downstream backwall is removable attached via friction fit. The downstream backwall may include at least one groove aligned with a groove of the bottom surface of the cartridge. In other embodiments, the downstream backwall may include at least one groove aligned with a groove of the top surface of the cartridge.

The disclosed cartridges may include a cap that is removable attached to the top of the cartridge. For example, the cap may be removably attached to the cartridge via friction fit. In some embodiments of the disclosed cartridges, the downstream backwall comprises a tab and the cap comprises a slot, where the tab is positioned in the slot when the cap is placed on the cartridge. As such, the cap may lock the downstream backwall in place. Optionally, the cap comprises a tab on a top surface for grasping the cap.

The disclosed cartridges further may include components that provide surfaces for growth of biological agents that facilitate filtration or purification of water. For example, the disclosed cartridges may include rows of offset canopies. The offset canopies may be part of the downstream backwall or optionally may be provided by a separate removable component that is attached to the downstream backwall. In some embodiments of the disclosed cartridges, the cartridges include a separate removable component having rows of offset canopies, the removable component being removable attached to the downstream backwall. Optionally, the removable component includes at least one groove aligned with a groove of the bottom surface of the cartridge or includes at least one groove aligned with a groove of the top surface of the cartridge. In further embodiments, the removable component includes a top tab and the disclosed cartridge includes a cap where the cap includes a slot into which the top tab is inserted when the cap is placed on top of the cartridge.

The disclosed cartridges typically include material for filtering or purifying water. Suitable material may include, but is not limited to, foam material and activated charcoal.

Also disclosed are water filtration systems that include the disclosed cartridges. The systems may include a housing into which the cartridge is placed. The systems may include one or more of the disclosed cartridges. For example, the systems may include multiple vertically stacked cartridges where the stacked cartridges are attached via male and female components on top and bottom surfaces of the cartridges. In some embodiments, the cartridges are attached via alternating tongue and groove fits present on top and bottom surfaces of the attached cartridges.

DETAILED DESCRIPTION

The subject matter disclosed herein is described using several definitions, as set forth below and throughout the application.

Unless otherwise specified or indicated by context, the terms "a," "an," and "the," mean "one or more." For example, "a cartridge" should be interpreted to mean "one or more cartridges."

As used herein, the terms "include" and "including" have the same meaning as the terms "comprise" and "comprising."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

Due to the small size of many internal water filters the filter media capacity is very limited. Large flat filter cartridges or pads that are traditionally used in external filters are not practical. This means that smaller filter cartridges are used that have a much smaller surface area and media capacity. If only a small area of the filter media is exposed to the incoming water it will clog quickly and limit the effectiveness of all downstream media in the filter. It is desirable to maximize the amount of surface area of the filter cartridge that can catch debris before the cartridge clogs and it becomes ineffective.

Disclosed herein is a filter cartridge for use in an internal water filtration unit that has a wedge shape that maximizes the surface of the filter cartridge available for useful filtration as well as a modular stackable design that maintains this large area for filtration. The wedge shaped side of the cartridge is oriented towards the incoming dirty water increasing the surface area that can catch debris versus a flat surface.

Figure 1:
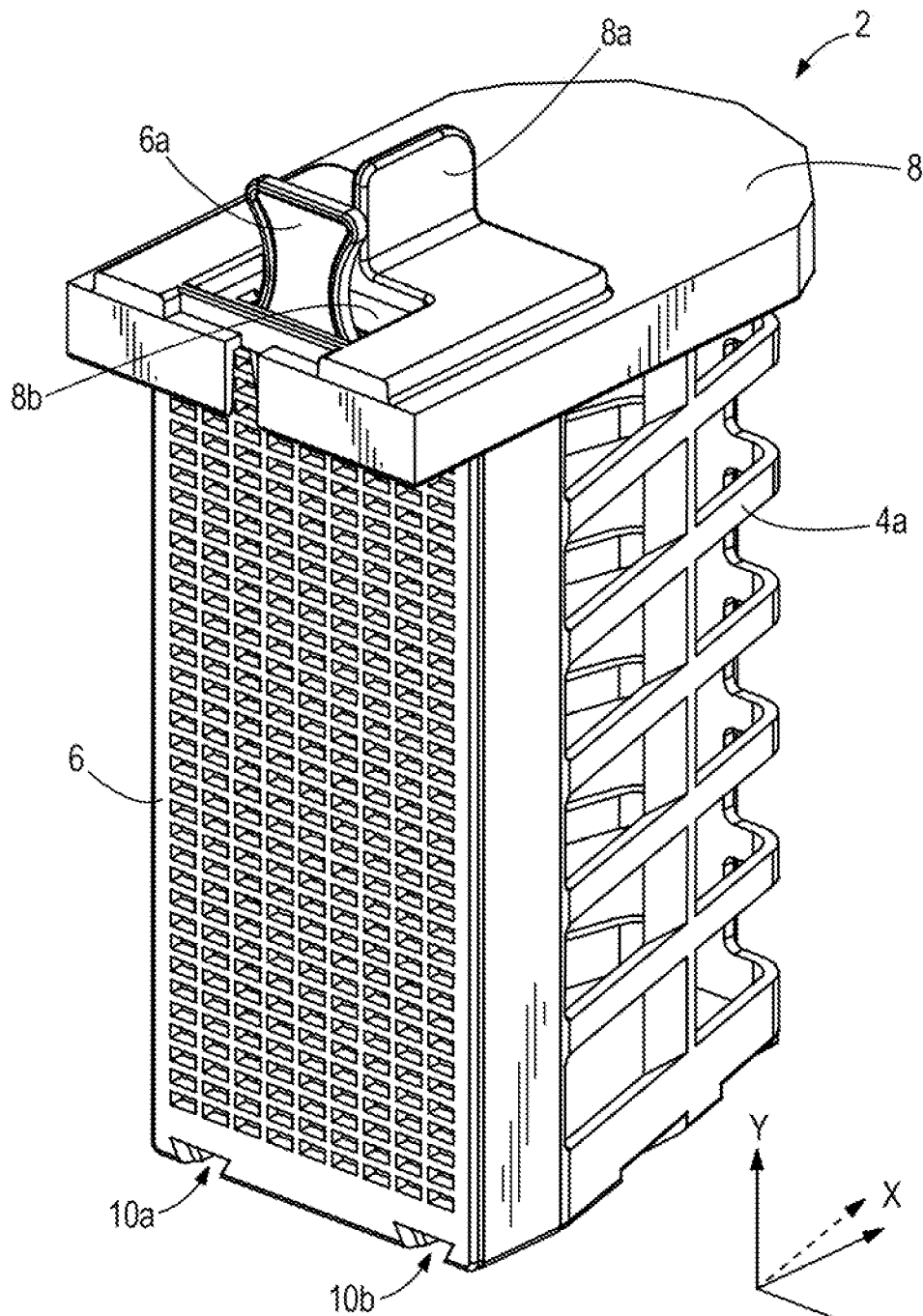
FIG. 1 provides a perspective view of one embodiment of a filter cartridge as contemplated herein.

Referring now to FIG. 1, shown is one embodiment of a filter cartridge 2 as contemplated herein. The cartridge is wedge-shaped and includes two upstream sidewalls 4a, 4b (not shown) and a downstream backwall 6. Upstream sidewalls 4a, 4b (not shown) are formed by a backbone and ribs permitting ingress of water to be filtered. Downstream backwall 6 is grated permitting egress of filtered water. Upstream sidewalls are angled towards the vertical midline of the cartridge away from the X-axis at their upstream ends (see dashed line). Downstream wall is in a plane formed by the Y-axis and the Z-axis.

Still referring to FIG. 1, downstream backwall 6 includes an upper tab 6a. The cartridge includes a cap 8 on a top surface. The cap includes an upper tab 8a for grasping the cap. The cap includes a slot 8b into which tab 6a is positioned when the cap is placed on top of the cartridge. The cap is removable attached to the filter cartridge via friction fit.

Figure 2:
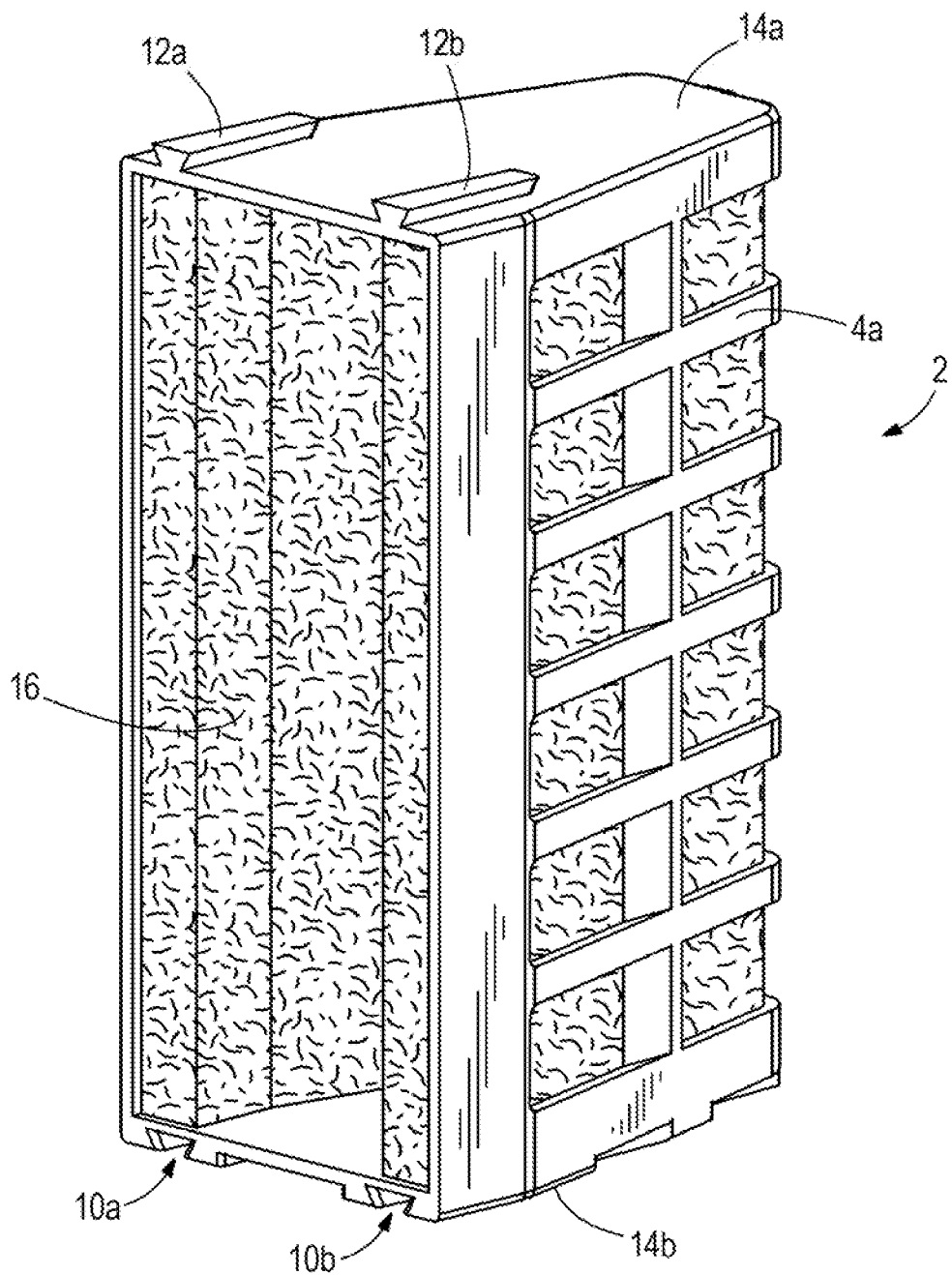
FIG. 2 provides a perspective view of another embodiment of a filter cartridge as contemplated herein.
Figure 3:
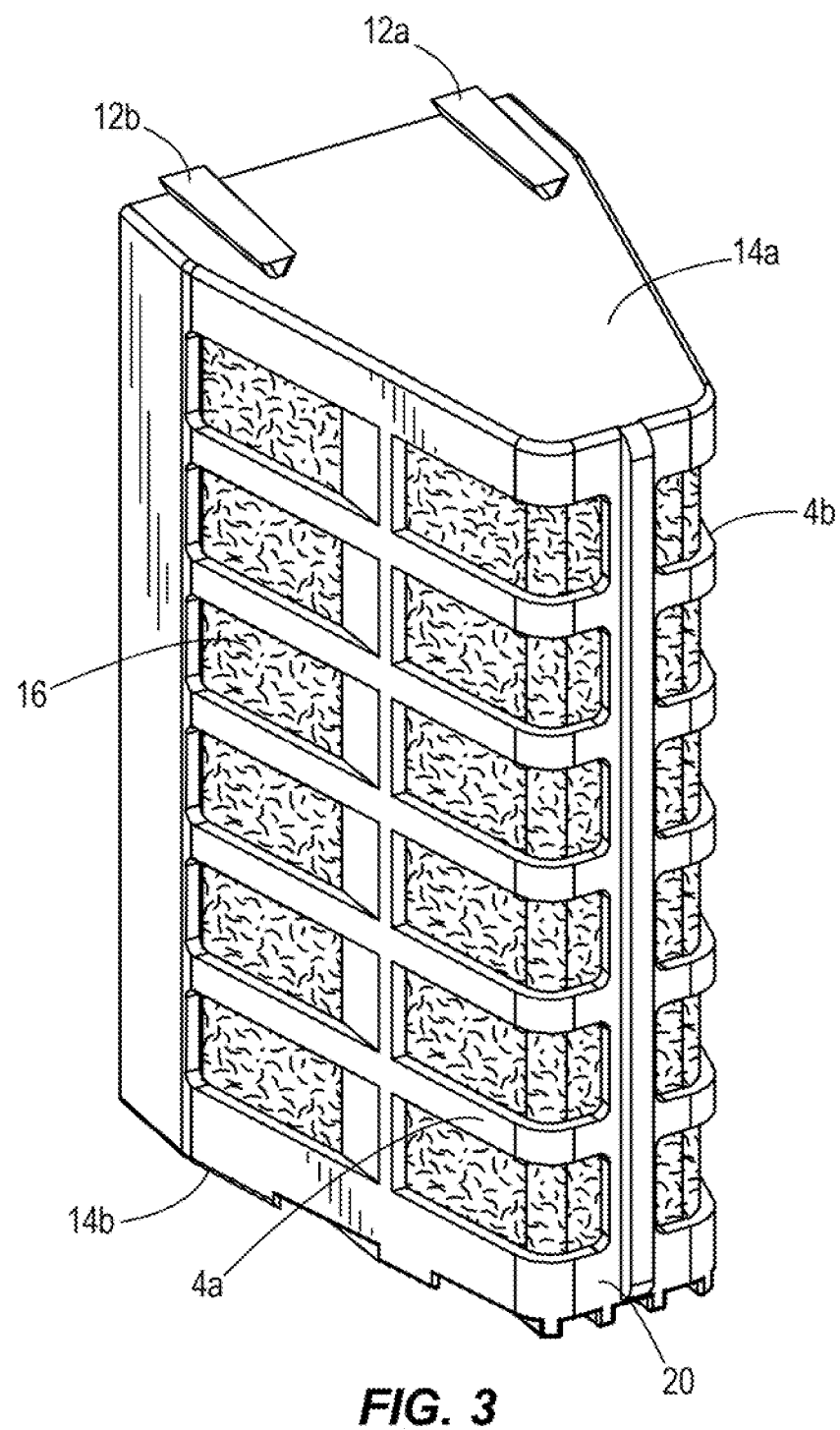
FIG. 3 provides a perspective view of another embodiment of a filter cartridge as contemplated herein.
Figure 4:
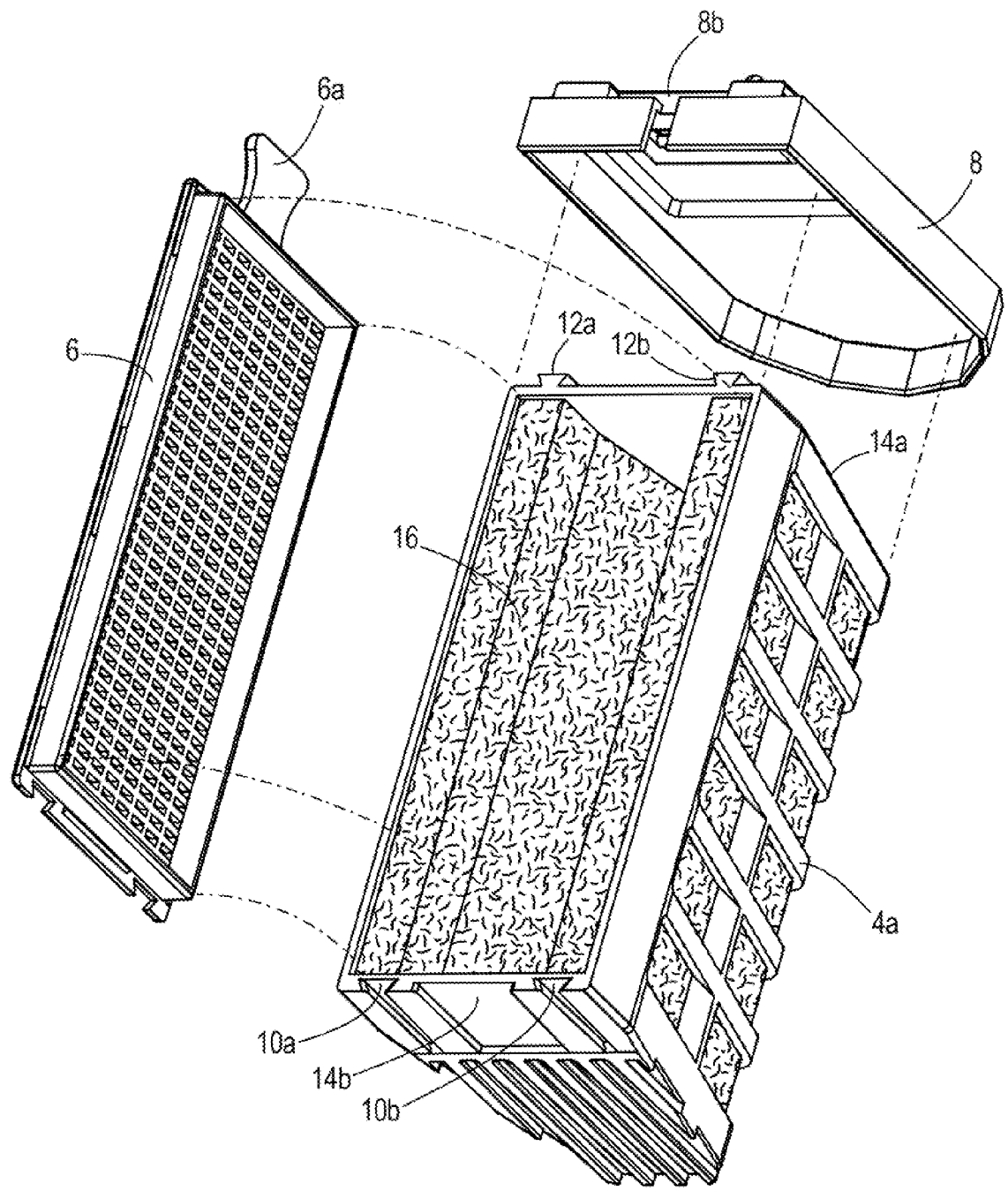
FIG. 4 provides a perspective view of another embodiment of a filter cartridge as contemplated herein.

FIG. 2 provides a perspective view of another embodiment of a filter cartridge 2 as contemplated herein. The cartridge is wedge-shaped and includes two upstream backwalls 4a, 4b (not shown). The downstream backwall 6 has been removed and may be attached to the filter cartridge via friction fit. Tongues 12a, 12b are positioned at the top of the cartridge 14a. Grooves 10a, 10b are positioned at the bottom of the cartridge 14b in alignment with upper tongues to permit stacking of cartridges. The inner area of the cartridge includes foam material 16. FIGS. 3 and 4 provides an additional perspective view of the filter cartridge of FIG. 2. As shown in FIG. 3, upstream sidewalls 4a, 4b (not shown) taper to form a web shape. The cartridge includes a substantially vertical upstream frontwall 20 where the upstream sidewalls 4a, 4b (not shown) are angled and connect the upstream frontwall 20 and the downstream backwall 6.

FIG. 4 provides a perspective view of another embodiment of a filter cartridge as contemplated herein. The cartridge of FIG. 4 includes an optionally top cap 8. In FIG. 4, the cap 8 has been removed and the downstream backwall 6 has been removed. The backwall 6 may be replaced and attached to the filter cartridge via friction fit. The cap may be placed on the top of the cartridge such that tab 6a is placed into slot 8b.

Figure 5:
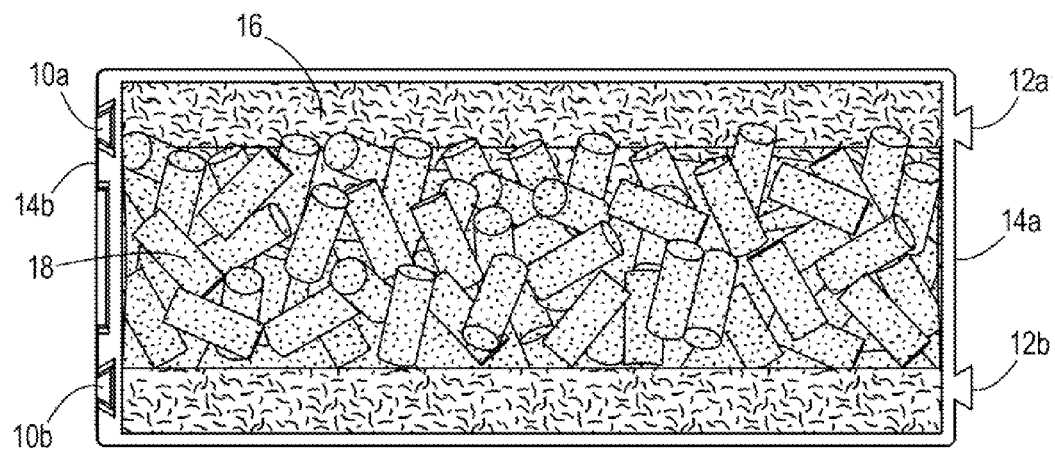
FIG. 5 provides a rear view of another embodiment of a filter cartridge as contemplated herein.
Figure 6:
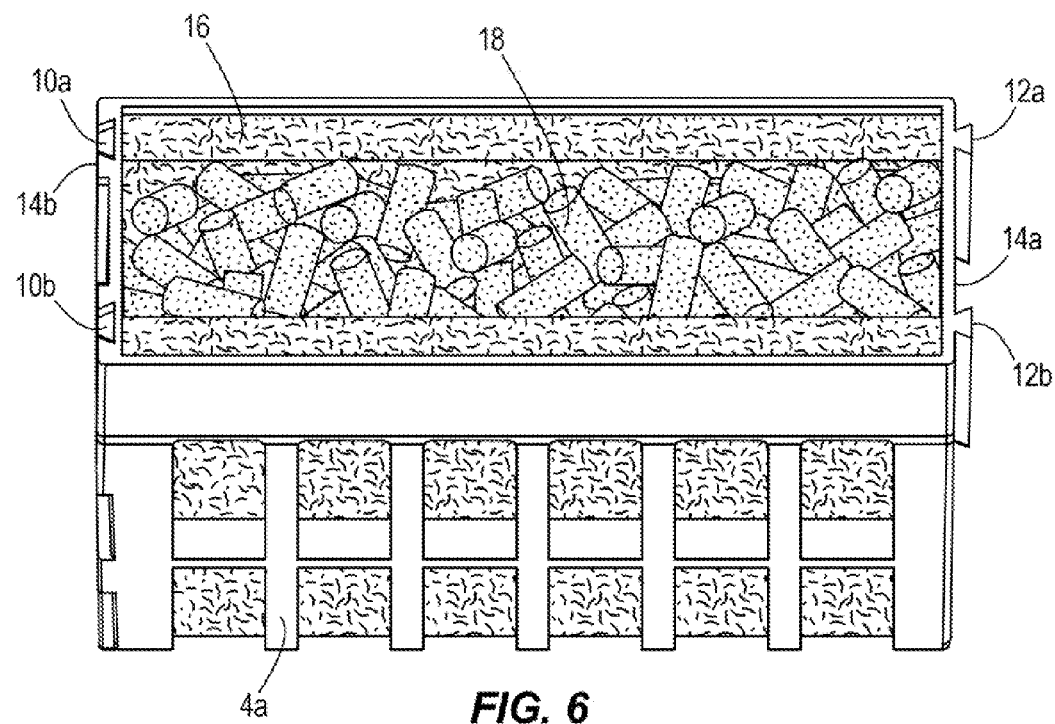
FIG. 6 provides a rear view of another embodiment of a filter cartridge as contemplated herein.

FIG. 5 provides a rear view of another embodiment of a filter cartridge as contemplated herein having downstream backwall 6 removed. FIG. 6 provides a rear perspective view of another embodiment of a filter cartridge as contemplated herein having downstream backwall 6 removed. The interior of the cartridge includes foam material 16 and activated charcoal 18.

Figure 7:
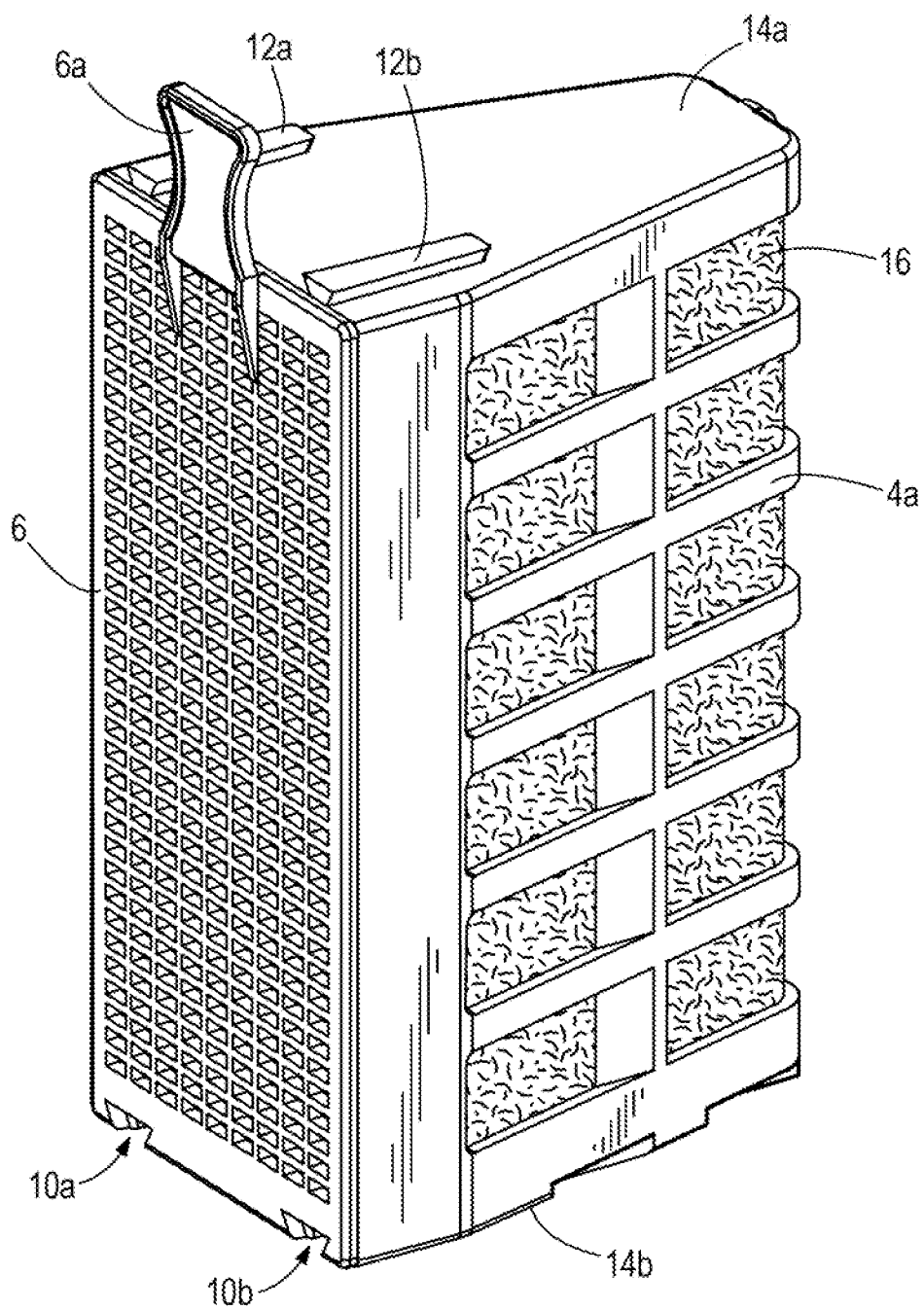
FIG. 7 provides a perspective view of another embodiment of a filter cartridge as contemplated herein.
Figure 8:
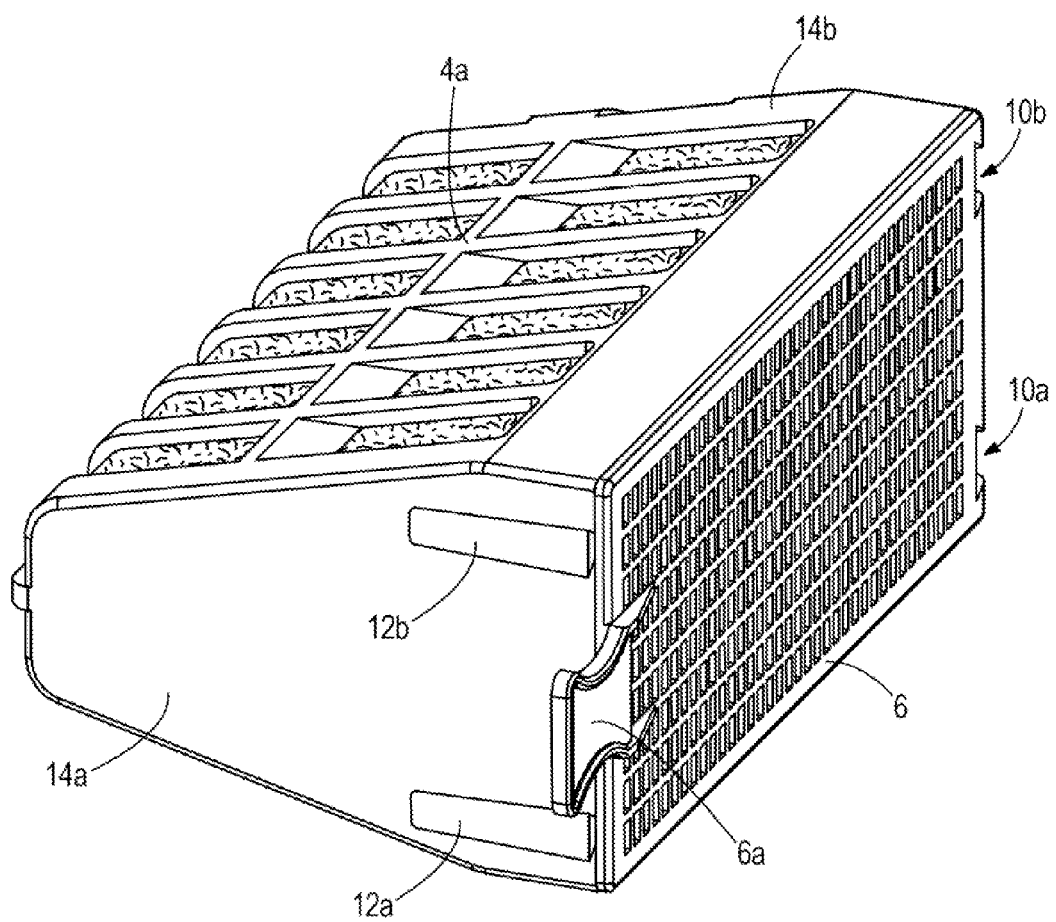
FIG. 8 provides a perspective view of another embodiment of a filter cartridge as contemplated herein.
Figure 9:
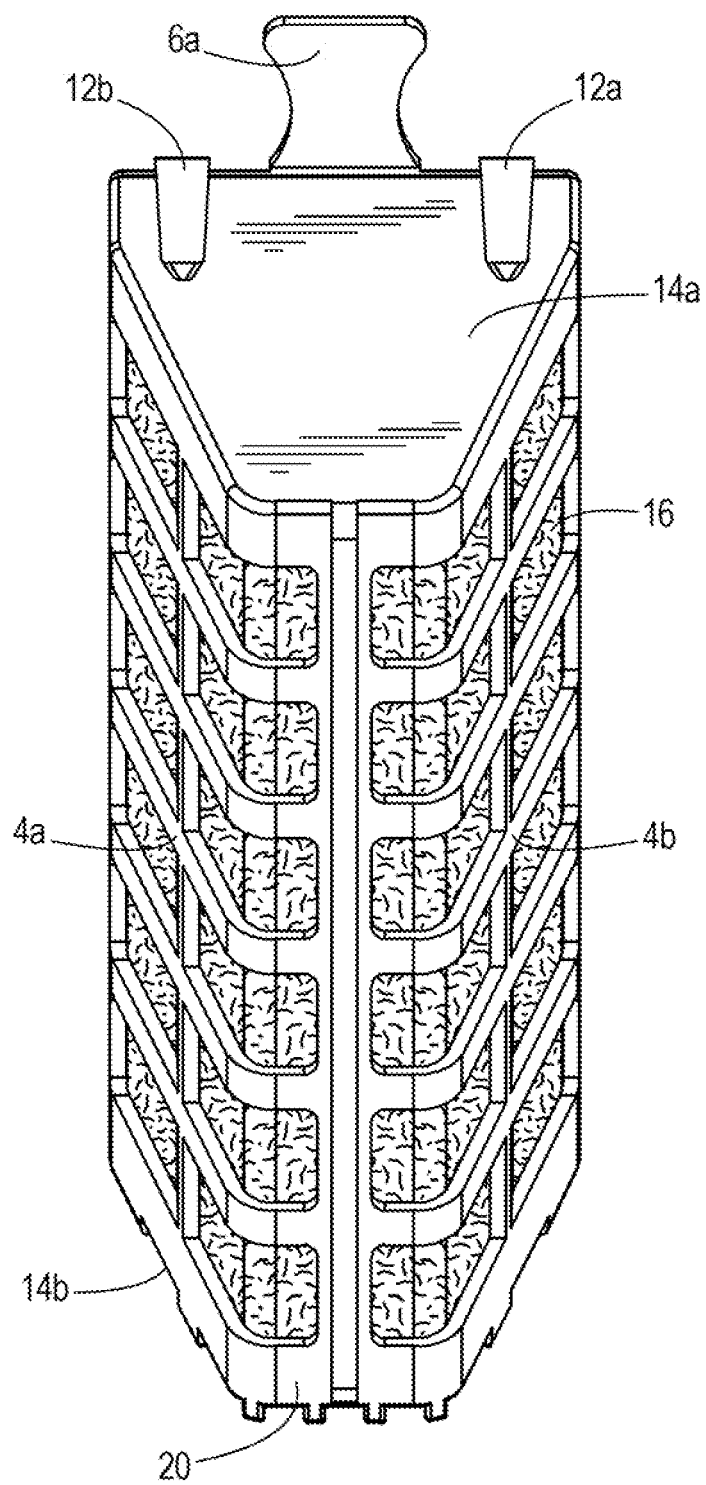
FIG. 9 provides a front perspective view of another embodiment of a filter cartridge as contemplated herein.

FIGS. 7-9 provide perspective view of another embodiment of a filter cartridge as contemplated herein.

Figure 10:
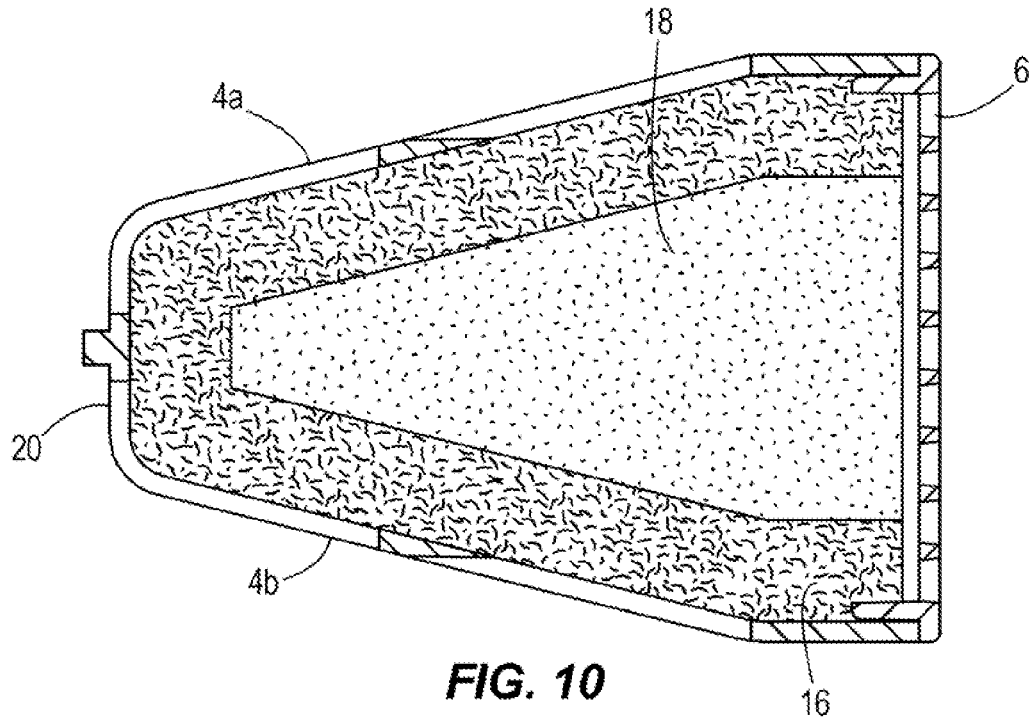
FIG. 10 provides a cross-sectional view of another embodiment of a filter cartridge as contemplated herein.
Figure 11:
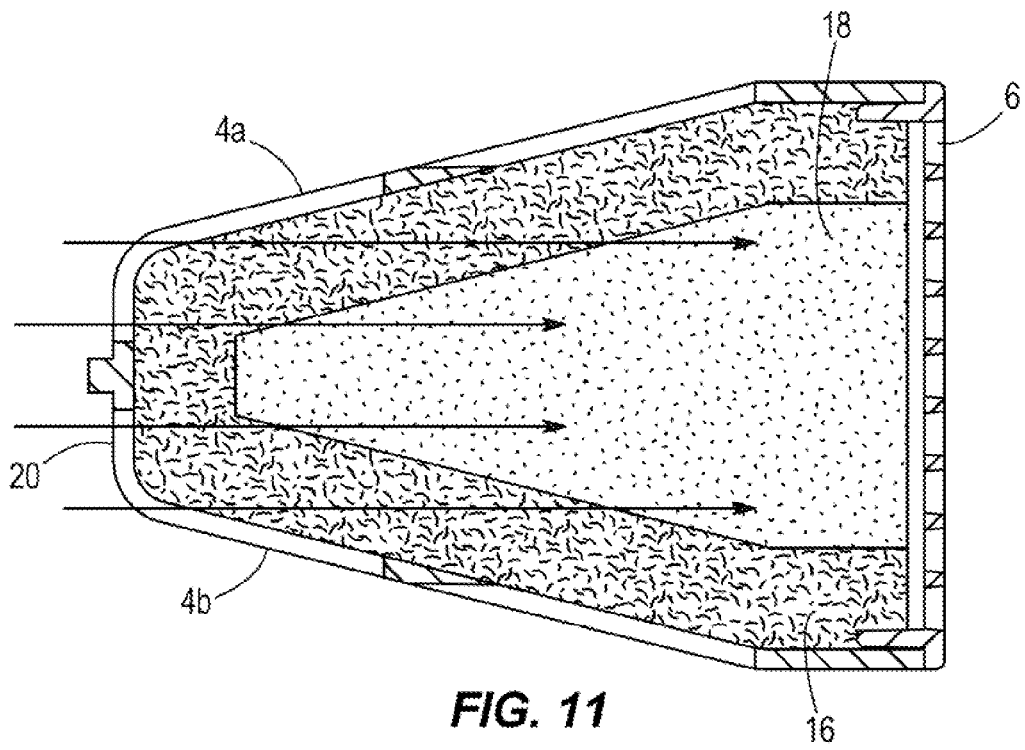
FIG. 11 provides a cross-sectional view of another embodiment of a filter cartridge as contemplated herein.

FIGS. 10 and 11 provide cross-sectional views of another embodiment of a filter cartridge as contemplated herein. In FIG. 11, arrows illustrate direction of water flow through the filter cartridge.

Figure 13:
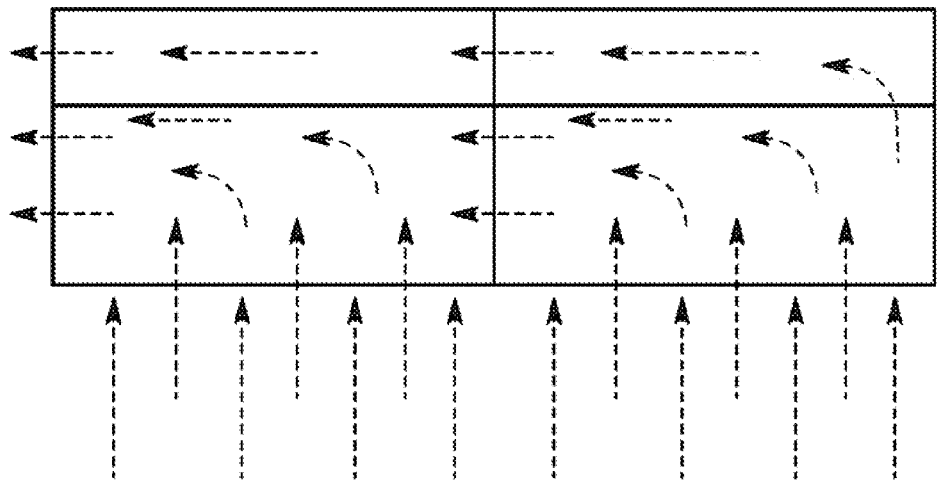
FIG. 13 illustrates the direction of water-flow through one embodiment of a filtration system as contemplated herein.
Figure 12:
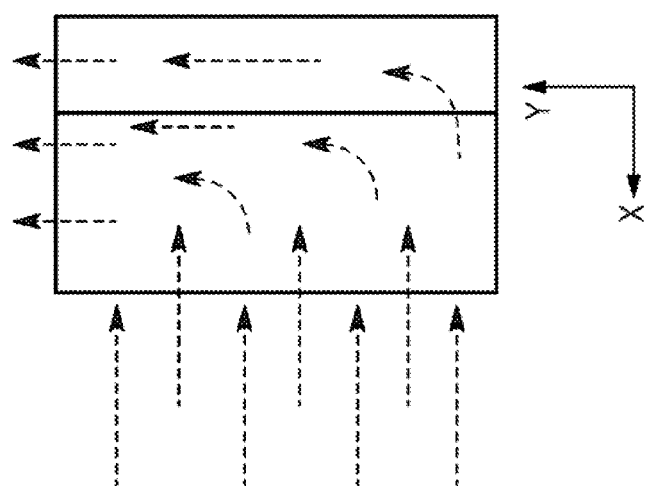
FIG. 12 illustrates the direction of water-flow through one embodiment of a filtration system as contemplated herein.

FIG. 12 illustrates the direction of water-flow through one embodiment of a filtration system as contemplated herein via dashed arrows. In FIG. 12, water enters the filter cartridge horizontally along the X-axis and is directly vertically upward along the Y-axis. The filtration system of FIG. 13 includes two filter cartridges.

Figure 14:
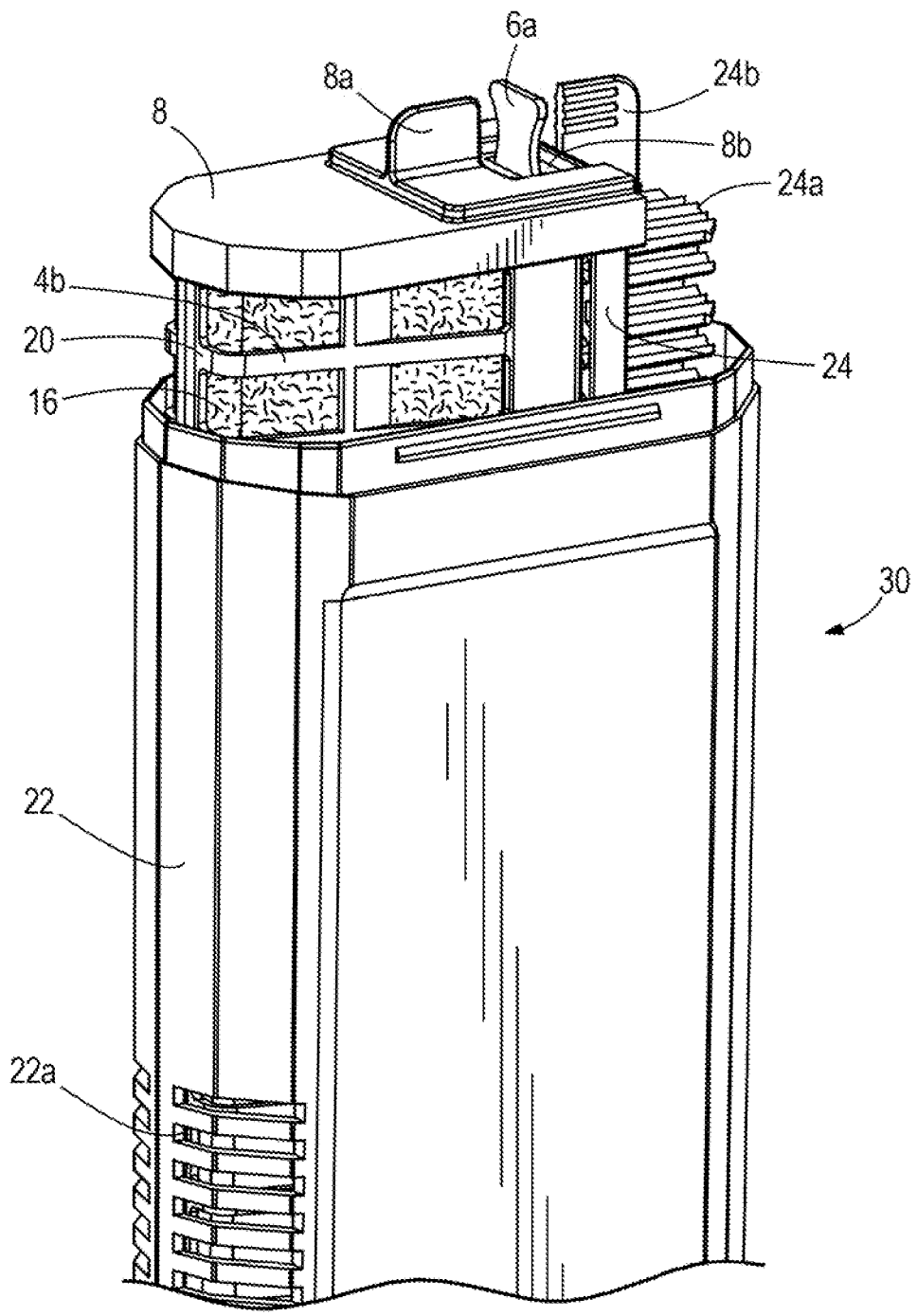
FIG. 14 provides a perspective view of one embodiment of a filtration system as contemplated herein.
Figure 15:
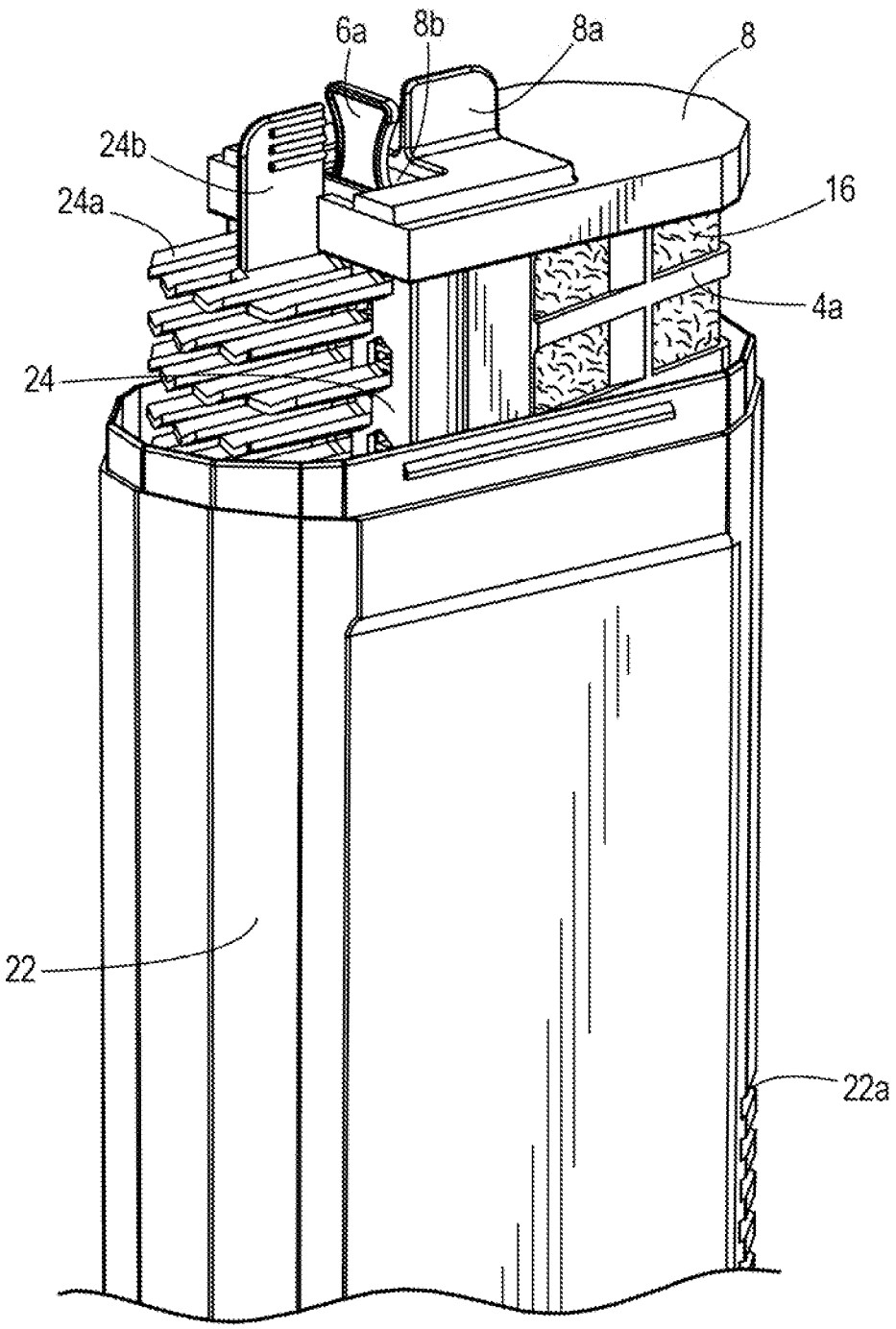
FIG. 15 provides a perspective view of another embodiment of a filtration system as contemplated herein.

FIGS. 14 and 15 provides two perspective views of one embodiment of a filtration system 30 as contemplated herein comprising one or more filtration cartridges 2 and a removable component 24 comprising rows of offset canopies 24a positioned within a housing 22. The housing permits ingress of water to be filtered through grate 22a. Removable component comprising rows of offset canopies 24a further includes a tab 24b for grasping the component. The tab 24b is positioned within slot 8b of the top cap 8.

Figure 16:
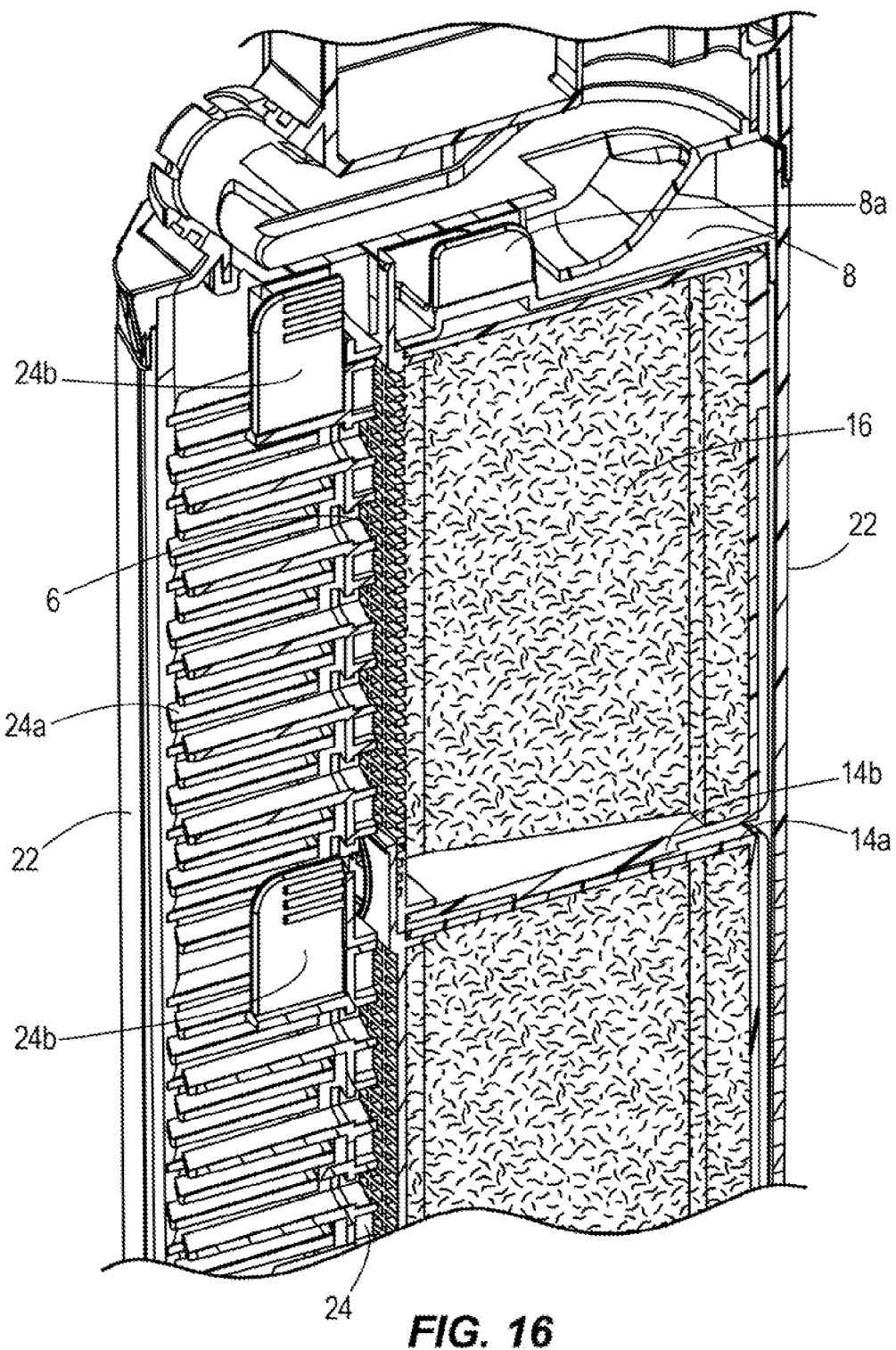
FIG. 16 provides a cross-sectional view of one embodiment of a filtration system as contemplated herein.
Figure 17:
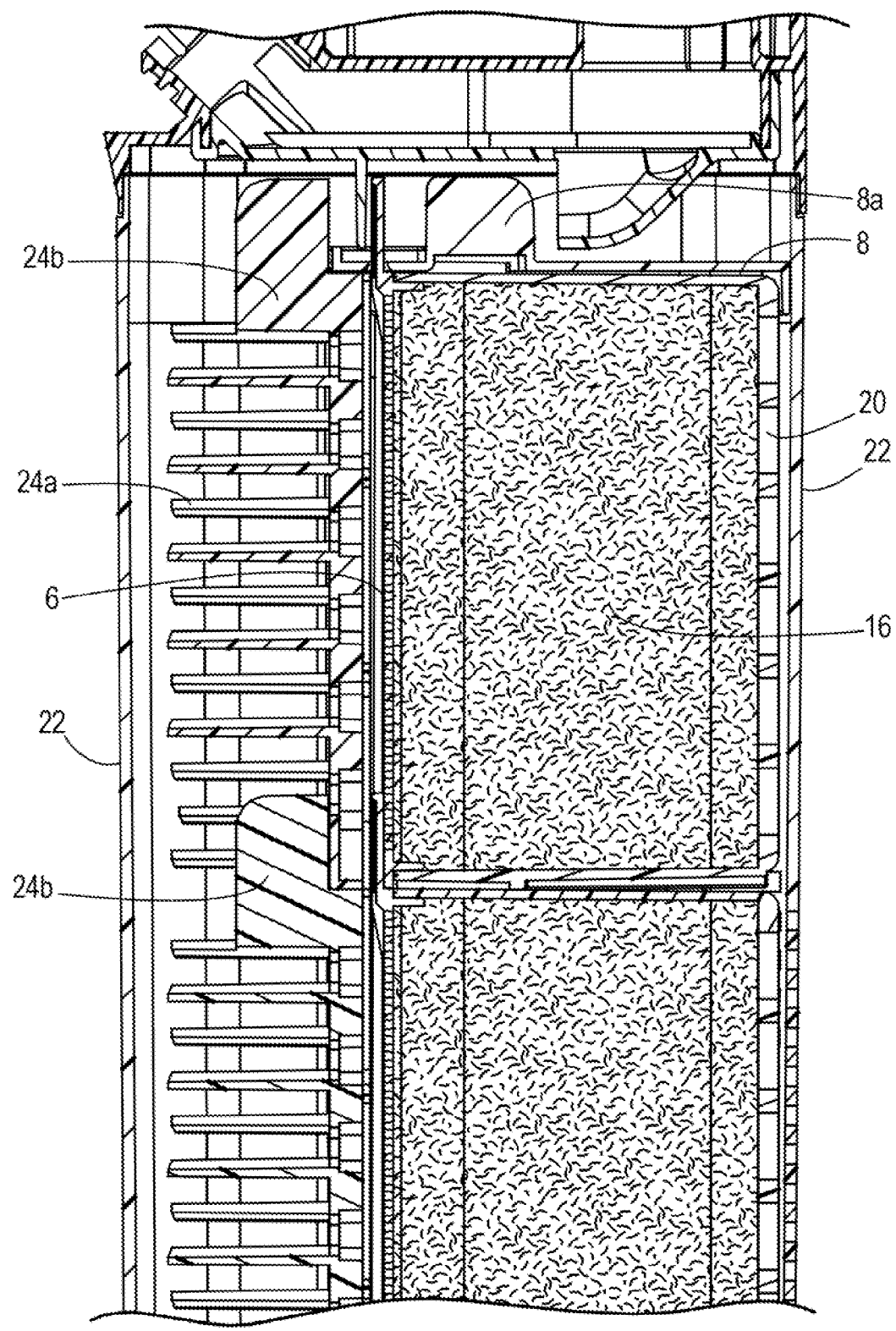
FIG. 17 provides a cross-sectional view of one embodiment of a filtration system as contemplated herein.
Figure 18:
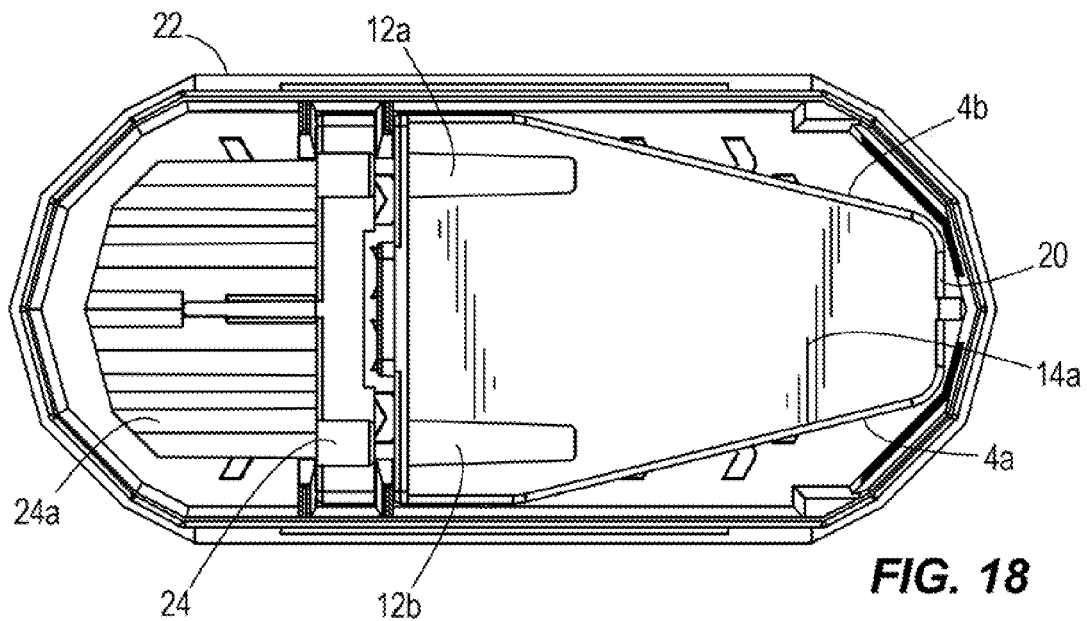
FIG. 18 provides a cross-sectional view of one embodiment of a filtration system as contemplated herein.

FIGS. 16 and 17 provide cross-sectional views through the X-Y plane of one embodiment of a filtration system 30 as contemplated herein comprising multiple filtration cartridges 2. The cartridges 2 are stacked in the system via sliding a top tongue 12a, 12b of one filtration cartridge into a bottom groove 10a, 10b of another filtration cartridge. The system optionally includes a removable insert comprising rows of offset canopies 22. FIG. 18 provides a cross-sectional view through the X-Z plane of the filtration system 30 of FIGS. 16 and 17.

Figure 19:
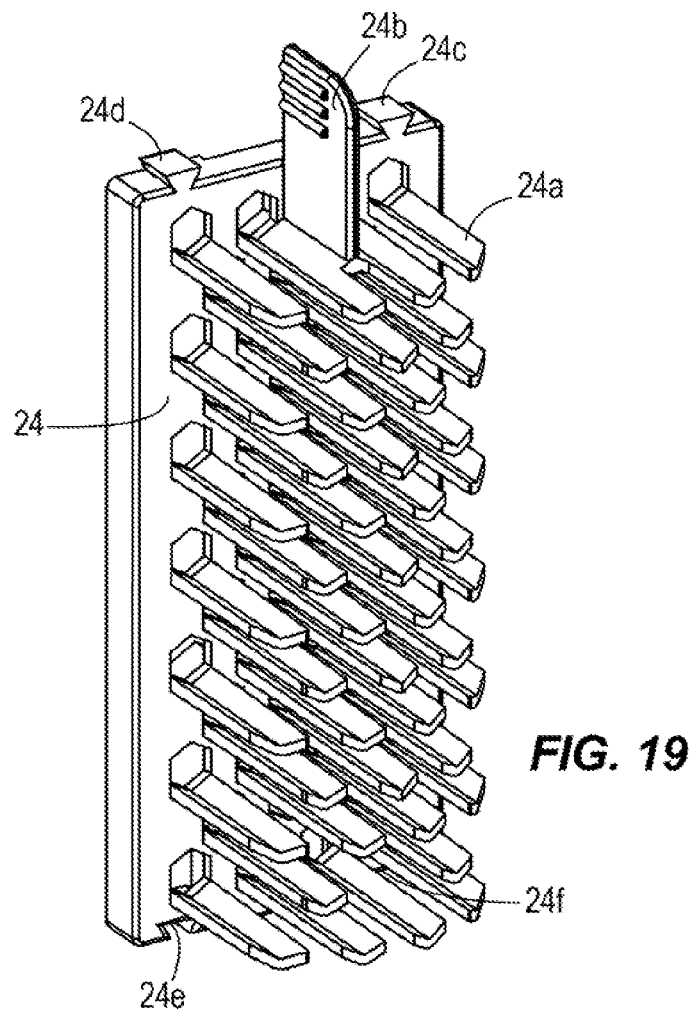
FIG. 19 provides a perspective view of one embodiment of a removable component having offset canopies for a filter cartridge.

FIG. 19 illustrates the optional removable component 24 comprising rows of offset canopies 24a and tab 24b. The component further includes upper tongues 24c, 24d and bottom grooves 24e, 24f that may be aligned with corresponding upper tongues and grooves on a top and bottom surface of the filter cartridge.

Figure 20:
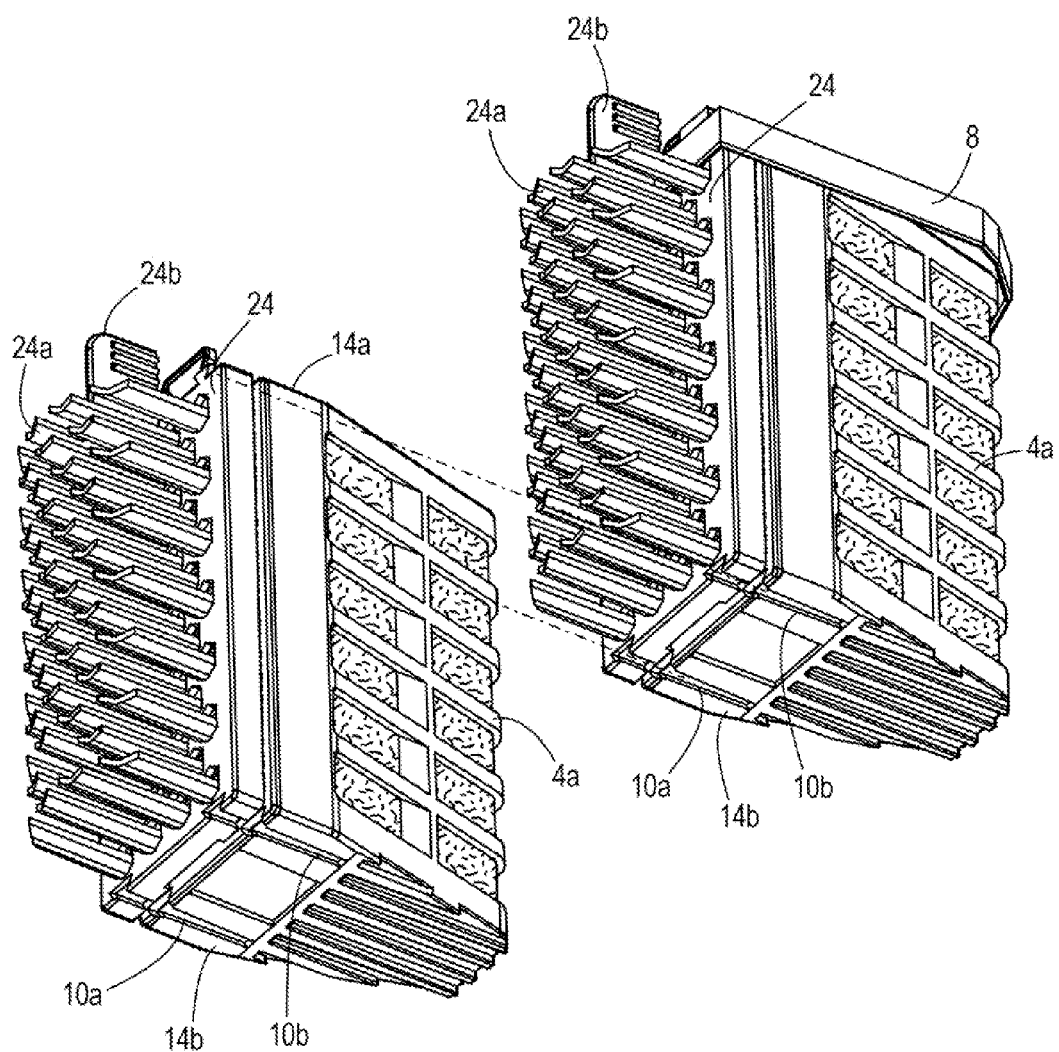
FIG. 20 provides a perspective view of one embodiment of attachable filter cartridges as contemplated herein.

FIG. 20 provides a perspective view of one embodiment of two attachable filter cartridges as contemplated herein. Two or more cartridges may be attached via tongues 12a, 12b and grooves 10a, 10b located on top surfaces 14a and bottom surfaces 14b of the filter cartridges, respectively. Also shown are optional removable components 24 having rows of offset canopies 24b.

Figure 21:
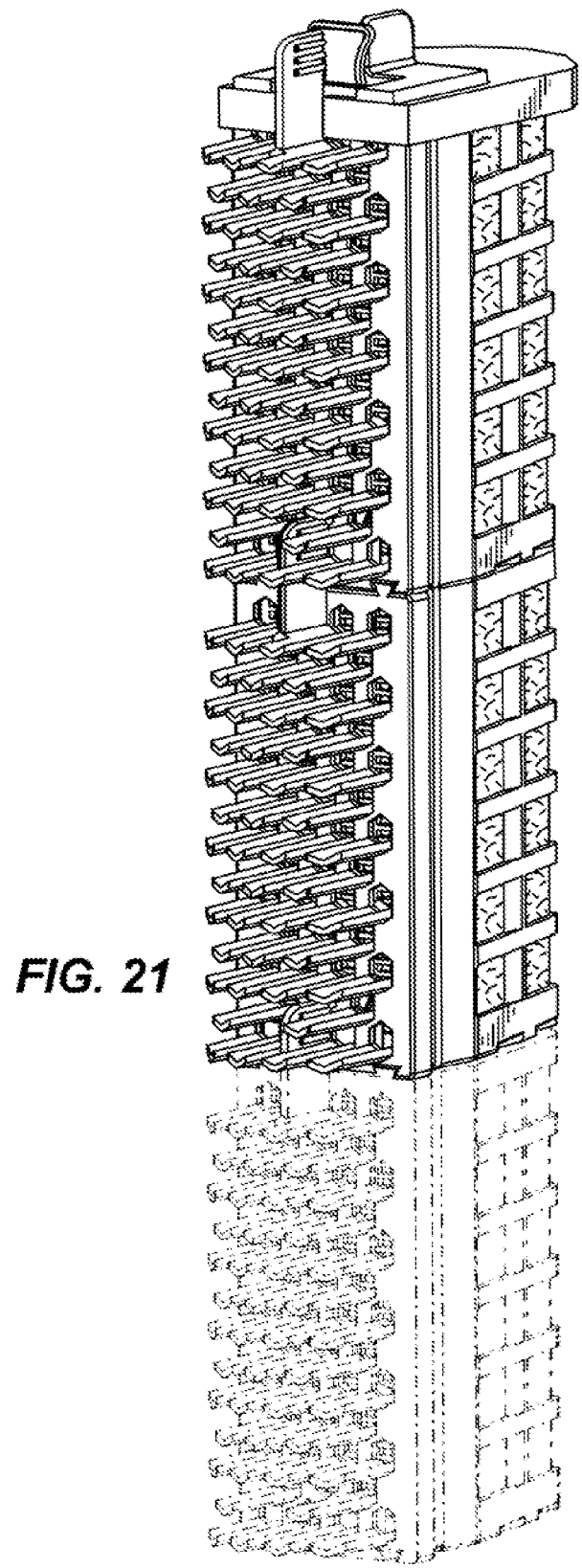
FIG. 21 provides a perspective view of one embodiment of attached filter cartridges as contemplated herein.

FIG. 21 provides a perspective view of one embodiment of three attached filter cartridges as contemplated herein.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent references are made herein. The cited references are incorporated by reference herein in their entireties. In the event that there is an inconsistency between a definition of a term in the specification as compared to a definition of the term in a cited reference, the term should be interpreted based on the definition in the specification.

What is claimed is:

1. A water filtration system comprising multiple filtration cartridges stacked vertically in a housing, the cartridges each comprising substantially vertical downstream wall permitting egress of filtered water, and each comprising two substantially vertical upstream walls permitting ingress of water for filtration, the upstream walls positioned at an angle relative to the downstream wall and forming a wedge shape.

2. The system of claim 1, wherein the downstream wall is removable from the cartridge for inserting filtration material.

3. The system of claim 2, wherein the downstream wall is attached to the cartridge via friction fit.

4. The system of claim 1, further comprising a cap attached to the top of one of the cartridges.

5. The system of claim 4, wherein the cap is attached to the cartridge via friction fit.

6. The system of claim 4, wherein the downstream wall comprises a tab and the cap comprises a slot, the tab being positioned in the slot when the cap is placed on the cartridge.

7. The system of claim 4, wherein the cap comprises a tab on a surface for grasping the cap.

8. The system of claim 1, further comprising a removable component having rows of offset canopies, the removable component being removably attached to the downstream wall.

9. The system of claim 1, further comprising, a cap and a removable component having rows of offset canopies, the removable component being attachable to the downstream wall wherein the downstream wall and the removable component comprise tabs and the cap comprises slots, the tabs being positioned in the slots when the cap is placed on the cartridge.

10. The system of claim 1, wherein at least one of the cartridges of the system comprises foam material and activated charcoal.

11. A water filtration system comprising multiple filtration cartridges stacked vertically in a housing and attached via alternating tongue and groove fits, the cartridges each comprising, a substantially vertical downstream wall permitting egress of filtered water, and each comprising two substantially vertical upstream walls permitting ingress of water for filtration, the upstream walls positioned at an angle relative to the downstream wall and forming a wedge shape.

12. The system of claim 11, wherein the cartridges each comprise at least one tongue on a top surface and at least one groove on a bottom surface, wherein the tongue and groove are substantially aligned for attaching two or more cartridges via sliding the tongue of a first cartridge into the groove of a second cartridge.

13. The system of claim 11, wherein the cartridges each comprise at least one tongue on a bottom surface and at least one groove on a top surface, wherein the tongue and groove are substantially aligned for attaching two or more cartridges via sliding the tongue of a first cartridge into the groove of a second cartridge.

14. The system of claim 12, further comprising a removable component having rows of offset canopies, the removable component being removably attached to the downstream wall and comprising at least one groove aligned with the groove of the bottom surface.

15. The system of claim 13, further comprising a removable component having rows of offset canopies, the removable component being removably attached to the downstream wall and comprising at least one groove aligned with the groove of the top surface.

16. The system of claim 12, wherein the downstream wall comprises at least one groove aligned with the groove of the bottom surface.

17. The system of claim 13, wherein the downstream wall comprises at least one groove aligned with the groove of the top surface.

* * * * *